United States Patent [19]

Garwood et al.

[11] 3,965,205

[45] June 22, 1976

[54] CONVERSION OF LOW OCTANE HYDROCARBONS TO HIGH OCTANE GASOLINE

[75] Inventors: William E. Garwood, Haddonfield; John A. Manzoni, Paulsboro; Thaddeus F. Whyte, Jr., Cherry Hill, all of N.J.; John J. Wise, Media, Pa.

[73] Assignee: Mobil Oil Corporation, New York, N.Y.

[22] Filed: June 10, 1974

[21] Appl. No.: 477,728

[52] U.S. Cl. .................................. 260/668 R
[51] Int. Cl.² .............................. C07C 15/00
[58] Field of Search ................... 260/668 R

[56] References Cited
UNITED STATES PATENTS

| | | | |
|---|---|---|---|
| 2,456,584 | 12/1948 | Gorin | 260/668 |
| 3,728,408 | 4/1973 | Tobias | 260/668 |
| 3,813,330 | 5/1974 | Giveus et al. | 260/668 |
| 3,827,867 | 8/1974 | Heinemann et al. | 260/668 |
| 3,894,106 | 7/1975 | Chang et al. | 208/141 |
| 3,894,107 | 7/1975 | Butter et al. | 208/141 |
| 3,907,915 | 9/1975 | Chang et al. | 208/141 |

*Primary Examiner*—D. Horwitz
*Attorney, Agent, or Firm*—Charles A. Huggett; Michael G. Gilman

[57] ABSTRACT

It is known to convert methanol and/or other relatively low molecular weight organic compounds containing at least one oxygen, sulfur, nitrogen or halogen hetero atom to high octane gasoline by contacting such with a particular group of crystalline aluminosilicate zeolites at conversion conditions. The instant disclosure shows improvements in total gasoline production from such process by inclusion of natural gas liquid or other light hydrocarbons having low octane numbers, preferably paraffinic, in the feed to said process thereby converting at least a portion of these lighter materials as well to high octane gasoline boiling range components.

12 Claims, 1 Drawing Figure

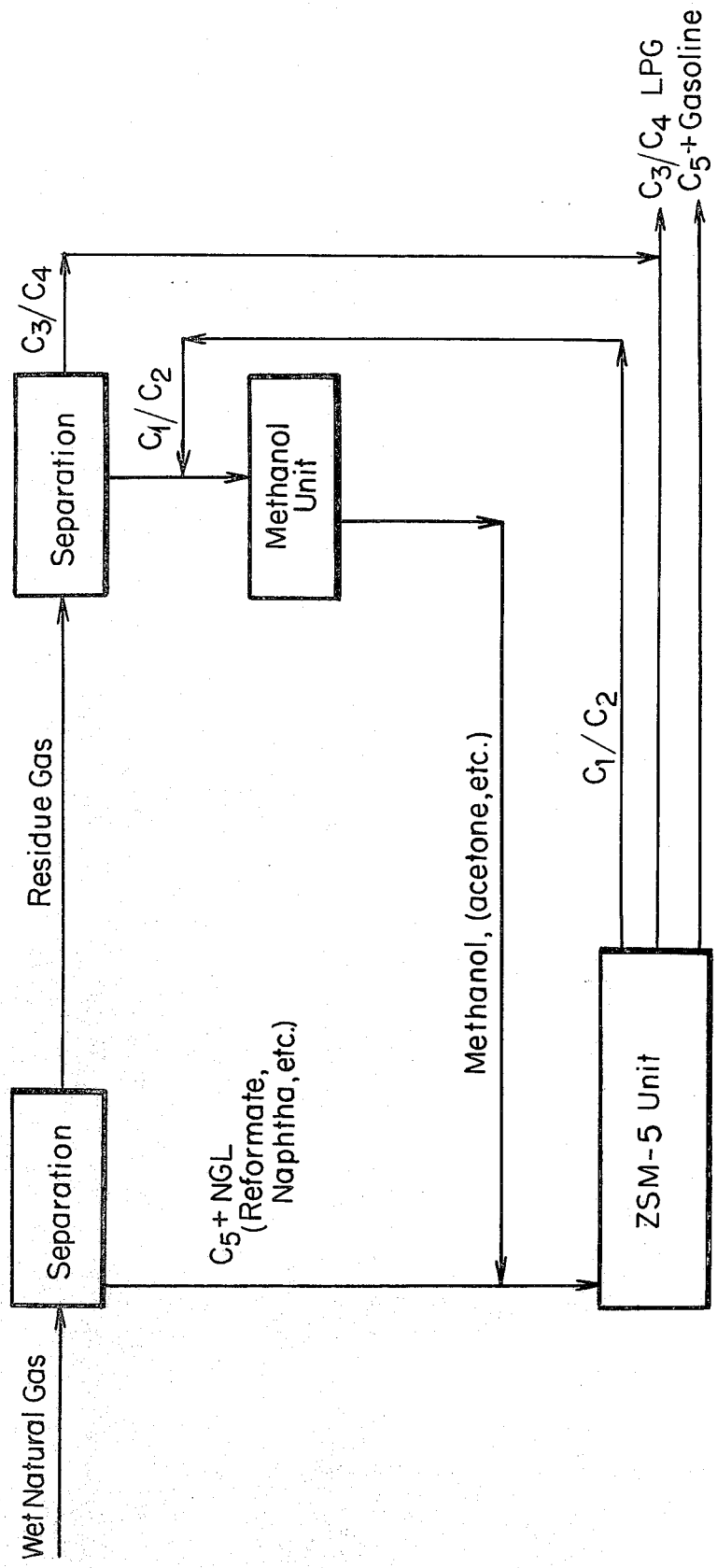

CONVERSION OF LOW OCTANE HYDROCARBONS TO HIGH OCTANE GASOLINE

This invention relates to manufacturing gasoline. It more particularly refers to a process of converting blends of methanol and natural gas liquids to high octane gasoline.

There has recently been discovered a process for converting relatively low molecular weight aliphatic organic compounds, containing up to about 8 carbon atoms in their longest hydrocarbon chain and containing at least one oxygen, sulfur, nitrogen or halogen hetero atom, to very high quality gasoline boiling range hydrocarbon materials. These hetero atom substituted lower aliphatics are exemplified by alcohols, ethers, mercaptans, thioethers, carbonyls, thiocarbonyls, amines, amides and alkyl halides. Their conversion to high quality gasoline boiling range hydrocarbons is accomplished by contacting them alone or in admixture with each other in pure or impure state with a crystalline aluminosilicate zeolite catalyst having a silica to alumina ratio of at least about 12, a constraint index (defined below) of about 1 to 12 and preferably a crystal density not substantially below about 1.6 grams per cubic centimeter. Conversion is accomplished at about 400° to 1000°F. Reference is made to U.S. application Ser. Nos. 387,223, 387,222 and 387,224, all filed on Aug. 8, 1973 now U.S. Pat. Nos. 3,894,107, 3,894,106 and 3,907,915, respectively, the entire contents of which are incorporated herein by reference, including the references therein to illustrative zeolite catalysts.

For purposes of this disclosure, the catalyst group will be illustrated by ZSM-5 and the hetero atom containing organic feed will be illustrated by methanol. It will be understood that these illustrative materials are utilized in this disclosure for simplicity sake and are in no way limiting upon the scope of the materials they represent.

Typical natural gas consists of hydrocarbons having a low boiling point. Methane makes up approximately 85% of the typical gas. Ethane is likely to be present in amounts up to 10%; and propane up to 3%. Butane, pentane, hexane, heptane and octane may also be present. Whereas normal hydrocarbons having 5–10 carbon atoms are liquid at ordinary temperatures and pressures, these paraffins of higher molecular weight are present in natural gas in vapor form. Types of natural gas vary according to composition to result in a dry or lean (mostly methane) gas, wet gas which contains considerable amounts of so-called higher hydrocarbons, residue gas from which higher paraffins having been extracted and casing head gas which is derived from an oil well by extraction at the surface. Natural gas occurs in porous rock with or near accumulation of crude oil, and is always present to some extent wherever oil has been found.

In conventional processing, wet natural gas is subjected to a separation in which a $C_5^+$ fraction, called natural gas liquid, is removed leaving a residue gas which is then conventionally separated into a $C_1/C_2$ dry gas fraction and a $C_3/C_4$ LPG fraction.

It is conventional to convert the $C_1/C_2$ to methanol or to so-called "methyl fuel", which is a mixture of alcohols. As noted above, processes have recently been developed for converting methanol, methyl fuel or the like to high quality gasoline. One can therefore consider that, by combining these known and new processes, it is now possible to convert dry gas to high quality, highly aromatic gasoline. It would be desirable to increase the gasoline production from natural gas.

It is therefore an important object of this invention to convert more of the natural gas than just the dry gas portion to gasoline.

It is another object of this invention to convert low quality components of natural gas, particularly natural gas liquids, to additional gasoline values.

It is a further object of this invention to provide means for increasing the gasoline yield obtained by converting methanol and the like.

Other and additional objects of this invention will become apparent from a consideration of this entire specification including the claims and the drawing hereof.

Understanding of this invention will be facilitated by reference to the accompanying drawing, the single FIGURE of which is a block flow diagram of a representative process configuration according to this invention.

In accord with and fulfilling these objects, one aspect of this invention lies in a process comprising forming a feedstock comprising at least one lower aliphatic organic compound containing at least one hetero atom constituent as aforesaid and an effective amount up to about 95 volume percent, based upon the volume of lower aliphatic organic component, of light hydrocarbon having an average octane number of up to about 85; containing such feedstock with a crystalline aluminosilicate zeolite, having a silica to alumina ratio of at least about 12, a constraint index of about 1 to 12 and preferably a crystal density of not substantially below about 1.6 grams per cubic centimeter, all of which being as defined in application Ser. No. 387,223, filed Aug. 9, 1973 now U.S. Pat. No. 3,894,107 at about 400° to 1000°F for a time sufficient to convert at least some of said lower aliphatic organic compound and at least some of said light hydrocarbon to a product comprising a substantially hydrocarbon liquid boiling in the gasoline boiling range having a clear research octane number higher than that of the feed, hydrocarbon, preferably at least about 85; and recovering said liquid. Preferred space velocities are about 0.5 to 40 LHSV.

In a preferred aspect of this invention, the light hydrocarbon portion of the combined feedstock hereof is natural gas liquid. This preferred material is particularly synergistic in the overall described process if one considers this entire process as starting with natural gas at the wellhead. This natural gas is conventionally treated so as to remove the low octane number liquid hydrocarbon content thereof; the remaining gas can be converted to oxygenated derivatives thereof such as methanol or alcohol mixtures; the natural gas liquid and the oxygenated derivatives are admixed; the admixture is converted to gasoline boiling range hydrocarbons as aforesaid; and any by-product gas from this conversion can be recycled back to admixture with the natural gas.

It is an important aspect of this invention that the amount of gasoline produced by this process is higher than the amount which would have been produced from converting an equivalent quantity of said aliphatic organic compound without admixture with hydrocarbon as aforesaid under the same conversion conditions, and that the volatility characteristics of the gasoline so produced are significantly improved. It is recognized that a U.S. patent application Ser. No. 472,408, filed May 22, 1974 now U.S. Pat. No. 3,904,508 discloses and claims the admixture of gasoline produced by the conversion of methanol, and/or similar lower aliphatic organic materials, with natural gas liquids so as to produce a gasoline boiling range product of higher volume and excellent octane number. The instant process is to be distinguished over this in that the aliphatic organic compound is converted along with and in the presence of the low octane hydrocarbon co-feed and actually interacts with it in some way, and is not a physical admixture of products.

While it would appear that there is a remarkable synergism in converting both the dry gas portion and the natural gas liquids portion of natural gas from the wellhead to gasoline by the process of this invention, the process hereof is by no means limited to feed stocks utilizing only natural gas liquid as the hydrocarbon portion thereof. Other relatively low octane number hydrocarbon fractions can similarly be used. These include straight run naphthas, catalytically cracked gasoline, coker gasoline, light and heavy reformate, hydrocracked gasoline, light gas oil, etc. The class of zeolites utilized in this invention has some unusual properties. These zeolites, by themselves, induce profound transformations of aliphatic hydrocarbons to aromatic hydrocarbons in commercially desirable yields. Although they have unusually low alumina contents, i.e. high silica to alumina ratios, they are very active even when the silica to alumina ratio exceeds 30. The activity is surprising since the alumina in the zeolite framework is believed responsible for catalytic activity. They retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity.

An important characteristic of the crystal structure of this class of zeolites is that it provides constrained access to, and egress from, this intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred zeolites useful in this invention possess, in combination: a silica to alumina ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic form within the channels. Although zeolites with a silica to alumina ratio of at least 12 are useful, it is preferred to use zeolites having higher ratios of at least about 30. Such zeolites, after activation, acquire an intracrystalline sorption capacity for normal hexane which is greater than that for water, i.e. they exhibit "hydrophobic" properties. It is believed that this hydrophobic character is advantageous in the present invention.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by eight membered rings of oxygen atoms, then access to molecules of larger cross-section than normal hexane is excluded and the zeolite is not of the desired type. Windows of ten-membered rings are preferred, although excessive puckering or pore blockage may render these zeolites ineffective. Twelve-membered rings do not generally appear to offer sufficient constraint to produce the advantageous conversions, although structures can be conceived, due to pore blockage or other cause, that may be operative.

Rather than attempt to judge from crystal structure whether or not a zeolite possesses the necessary constrained access, a simple determination of the "constraint index" may be made by passing continuously a mixture of equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000°F for at least 15 minutes. The zeolite is then flushed with helium and the temperature adjusted between 550°F and 950°F to give an overall conversion between 10% and 60%. The mixture of hydrocarbons is passed at 1 liquid hourly space velocity (i.e. 1 volume of hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10} (\text{fraction of n-hexane remaining})}{\log_{10} (\text{Fraction of 3-methylpentane remaining})}$$

The constraint index approximates the ratio of the cracking rate constants for the two hydrocarbons. Zeolites suitable for use as catalysts for the present invention are those having a constraint index from 1.0 to 12.0, preferably 2.0 to 7.0.

The class of zeolites defined herein is exemplified by ZSM-5, ZSM-11, ZSM-12, ZSM-21, TEA mordenite and other similar materials. Recently issued U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in West German Offenlagunschrifft No. 2,213,109, the entire contents of which are incorporated herein by reference.

ZSM-21 is more particularly described in U.S. application, Ser. No. 358,192, filed May 7, 1973, now abandoned, the entire contents of which are incorporated herein by reference.

TEA mordenite is more particularly described in U.S. application Ser. No. 130,442 filed Apr. 11, 1971, now abandoned, the entire contents of which are incorporated herein by reference.

The specific zeolites described, when prepared in the presence of organic cations, are catalytically inactive, possibly because the intracrystalline free space is occupied by organic cations from the forming solution. They may be activated by heating in an inert atmosphere at 1000°F for 1 hour, for example, followed by base exchange with ammonium salts followed by calcination at 1000°F in air. The presence of organic cations in the forming solution may not be absolutely essential to the formation of this type zeolite; however, the presence of these cations do appear to favor the formation of this special type of zeolite. More generally, it is desirable to activate this type zeolite by base exchange with ammonium salts followed by calcination in air at about 1000°F for from about 15 minutes to about 24 hours.

Natural zeolites may sometimes be converted to this type zeolite by various activation procedures and other treatments such as base exchange, steaming, alumina extraction and calcination, in combinations. Natural minerals which may be so treated include ferrierite, brewsterite, stillbite, dachiardite, epistilbite, heulandite and clinoptilolite. The preferred crystalline aluminosilicates are ZSM-5, ZSM-11, ZSM-12, ZSM-21 and TEA mordenite, with ZSM-5 particularly preferred.

In a preferred aspect, the zeolites used herein are selected as those having a crystal density, in the dry hydrogen form, of not substantially below about 1.6 grams per cubic centimeter. It has been found that zeolites which satisfy all three of these criteria are most desired. Therefore, the preferred catalysts of this invention utilize zeolites having a constraint index as defined above of about 1 to 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g. on page 11 of the article on Zeolite Structure by W. M. Meier. This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density, of course, must be associated with a relatively small amount of free space within the crystal, which might be expected to result in more stable structures. This free space, however, is important as the locus of catalytic activity.

The following examples are illustrative of the instant invention without being limiting upon the scope thereof. Parts and percentages are by weight unless specified to be on some other basis.

EXAMPLE 1 — PRIOR ART

Methanol was converted to higher hydrocarbons by contacting such with a ZSM-5 catalyst at 1 LHSV, 90 psig and a nominal temperature of 700°F. The catalyst was Ni/H/ZSM-5 having a silica to alumina ratio of 140. It was used in an alumina matrix (35 weight percent alumina), the composite catalyst containing 0.23 weight percent nickel and was sulfided.

The hydrocarbon product distribution was 69.3% $C_5^+$ gasoline having a clear research octane number of 98.1, 20% $C_4$, 7.2% $C_3$ and 3.5% $C_2 + C_1$.

EXAMPLE 2

Example 1 was repeated except that the feed was a blend of 90 volume percent methanol and 10 volume percent natural gas liquid having a clear research octane number of 54 and the following composition:

| | |
|---|---|
| I-$C_5$, Vol. % | 12.5 |
| N-$C_5$, Vol. % | 28.1 |
| 2M$C_5$, Vol. % | 11.5 |
| N-$C_6$, Vol. % | 11.5 |
| 2M$C_6$, Vol. % | 4.2 |
| 3M$C_6$, Vol. % | 4.2 |
| N-$C_7$, Vol. % | 5.2 |
| N-$C_8$, Vol. % | 6.2 |
| CY$C_6$, Vol. % | 3.1 |
| MCY$C_5$, Vol. % | 4.2 |
| MCY$C_6$, Vol. % | 3.1 |
| Benzene, Vol. % | 3.1 |
| Toluene, Vol. % | 3.1 |
| | 100.0 |

The hydrocarbon product distribution was 68% $C_5^+$ gasoline having a clear research octane number of 96.8, 19% $C_4$, 11% $C_3$ and 2% $C_2 + C_1$.

The process according to this Example produced 34.9 pounds of gasoline per 100 pounds of total feed and 15.3 pounds of $C_3/C_4$ LPG per 100 pounds of total feed as compared to 31.9 pounds of gasoline and 12.5 pounds of $C_3/C_4$ LPG respectively produced in Example 1. If one allocates product to feed proportions, it can be said that the methanol fed to this Example is responsible for 29.2 pounds of $C_5^+$ gasoline product and 11.4 pounds of $C_3/C_4$ LPG product while the co-fed natural gas liquid have been converted to 5.7 pounds of high quality gasoline. In contrast, if the methanol conversion process of Example 1 was carried out first and the gasoline product so produced blended with the same proportion of natural gas liquid charged in this Example, the blended gasoline would have a clear research octane number of 87.1, substantially less than the 96.8 reported hereinabove. If the natural gas liquid is converted separately to the same yield and the product blended with the methanol product, the blending gasoline has a clear research octane number of 95.5, again less than the 96.8 reported hereinabove. These data show a synergistic conversion of the methanol and the natural gas liquid co-fed herein.

EXAMPLE 3

Example 2 was rerun with a 50/50 volume percent blend of methanol and the same natural gas liquid as set forth in Example 2. The conversion results obtained were similar with more gasoline, more $C_3/C_4$ LPG being produced and with the $C_5^+$ gasoline having a somewhat reduced clear research octane number of 89.1. Comparing this product with that from blending methanol derived gasoline as per Example 1 with an equivalent proportion of natural gas liquid there is obtained a gasoline product having a much lower clear research octane number of 65.

It is interesting to note that the product produced by conversion of co-fed methanol and natural gas liquid according to this Example has significantly superior volatility characteristics as well as higher weight yield as compared to gasoline derived solely from methanol, VIS:

| | Methanol (Ex. 1) | 90/10 Methanol/NGL (Ex. 2) | 50/50 Methanol/NGL (This Example) |
|---|---|---|---|
| | (Simple Distillation of Liquid Product, °F) | | |
| 10% | 130 | 120 | 84 |
| 30% | 231 | 229 | 169 |
| 50% | 286 | 285 | 235 |
| 70% | 319 | 321 | 291 |
| 90% | 358 | 378 | 341 |
| 95% | 385 | 393 | 389 |

EXAMPLE 4

Example 3 was repeated substituting light reformate ($C_6$ — 242°F) for the natural gas liquids. The differences in product distribution and quality, compared to Example 3 show up in the fact that less $C_3/C_4$ LPG were produced and substantially more $C_5^+$ gasoline (75 weight percent) of much higher clear research octane number, 98.1, was produced. The light reformate co-feed had an octane number (R+O) of 76.

EXAMPLE 5

Example 3 was repeated feeding a 50/50 volume per cent blend of acetone and light reformate. The product was 88.2 weight percent liquid hydrocarbons having a clear research octane number of 95.7. The non-liquid portion of the hydrocarbon product was mostly butenes.

EXAMPLE 6

This Example was run similarly to Example 5 except that the feed was a 40/60 volume percent blend of acetone and full range reformate ($C_6^+$) and the catalyst was a ZSM-5 zeolite having a silica to alumina ratio of 70 and a nickel content of 0.37 weight percent. No binder was used and the catalyst was not sulfided. The reaction conditions were 700°F, 400 psig, 38.5 LHSV and a hydrogen to feed ratio of 6.4. Of the product, 92.4 weight percent was $C_5^+$ gasoline, and the remaining hydrocarbon product, that is the gas, mostly butenes.

What is claimed is:

1. A process for producing high octane gasoline which comprises forming a feed by admixing at least one lower aliphatic oxygenated organic alcohol, ether or ketone compound having up to about 8 carbon atoms in its longest hydrocarbon chain with an effective amount up to about 95 volume percent based on the volume of lower aliphatic organic component, of a hydrocarbon fraction having a clear research octane number up to about 85; contacting at about 400° to 1000°F said feed with an aluminosilicate zeolite catalyst having a silica to alumina ratio of at least about 12, a constraint index of about 1 to 12 and a crystal density of not substantially below about 1.6 grams per cubic centimeter; and recovering a product comprising a liquid fraction having a boiling range in the normal gasoline boiling range, a clear research octane number higher than that of the hydrocarbon portion of the feed and containing a major proportion of the carbon content of said feed.

2. A process as claimed in claim 1 wherein said organic compound comprises methanol, dimethyl ether or a mixture of the two.

3. A process as claimed in claim 1 wherein said hydrocarbon fraction is a natural gas liquid.

4. A process as claimed in claim 1 wherein said hydrocarbon fraction is in the gasoline boiling range.

5. A process as claimed in claim 1 wherein said catalyst is selected from the group consisting of ZSM-5, ZSM-11, ZSM-12 and ZSM-21.

6. A process as claimed in claim 1 wherein said catalyst is ZSM-5.

7. A process as claimed in claim 6 wherein said catalyst consisting essentially of nickel ZSM-5.

8. A process as claimed in claim 6 wherein said catalyst consisting essentially of zinc ZSM-5.

9. A process as claimed in claim 1 wherein said product has a clear research octane number of at least about 85.

10. A process as claimed in claim 1 wherein said hydrocarbon fraction is light reformate.

11. A process as claimed in claim 1 wherein said hydrocarbon fraction is in the gas oil boiling range.

12. A process as claimed in claim 1 carried out at a space velocity of about 0.5 to 40 LHSV.

* * * * *